United States Patent [19]

Schreiner et al.

[11] 4,362,494

[45] Dec. 7, 1982

[54] AUTOMATIC PRESS

[75] Inventors: Horst Schreiner; Bernhard Rothkegel, both of Nuremberg, Fed. Rep. of Germany

[73] Assignee: Siemens Aktiengesellschaft, Munich, Fed. Rep. of Germany

[21] Appl. No.: 310,986

[22] Filed: Oct. 13, 1981

Related U.S. Application Data

[63] Continuation of Ser. No. 174,905, Aug. 4, 1980, abandoned.

[30] Foreign Application Priority Data

Aug. 9, 1979 [DE] Fed. Rep. of Germany ....... 2932372

[51] Int. Cl.[3] ........................ B30B 11/10; B29C 3/00; B30B 11/06

[52] U.S. Cl. ....................................... 425/345; 425/78

[58] Field of Search ................................. 425/345, 78

[56] References Cited

U.S. PATENT DOCUMENTS

| | | | |
|---|---|---|---|
| 3,677,673 | 7/1972 | Shapiro | 425/345 X |
| 4,080,128 | 3/1978 | Schreiner et al. | 425/345 X |

*Primary Examiner*—J. Howard Flint, Jr.
*Attorney, Agent, or Firm*—Kenyon & Kenyon

[57] ABSTRACT

In the manufacture of molded single layer bodies in an automatic press, the press output is substantially increased by providing, on a circular table, at least two work positions at a predetermined distance from each other. At each work position, a pressing process for pressing the powder and an ejecting process for ejecting the finished molded body take place. Filling devices are arranged between the work positions in such a manner that the filling vessel of each filling device covers a wide angular range of the circular table. Pressing and ejecting take place during standstill of the press table, and the filling of the die takes place during the transport of the press table from the one to the other work position.

6 Claims, 5 Drawing Figures

AUTOMATIC PRESS

This is a continuation of application Ser. No. 174,905 filed Aug. 4, 1980, now abandoned.

BACKGROUND OF THE INVENTION

This invention relates to automatic presses in general and more particularly to an automatic press for the manufacture of molded bodies from materials in powder form, in which a rotatable circular table with a vertical axis of rotation is provided, on which filling devices with filling vessels and press tools are arranged with a uniform pitch.

Customarily, molded single layer bodies are pressed in automatic presses, wherein the filling, pressing and ejecting processes takes place in one position. The press output of such automatic presses is relatively low. It is an object of the invention to improve the known automatic presses in such a manner that their press output is increased substantially.

SUMMARY OF THE INVENTION

According to the present invention, this problem is solved by providing, on a circular table, at least two work positions spaced a given distance from each other in such a manner that in each work position a pressing process for pressing the powder and an ejecting process for ejecting the finished molded body takes place, and that the filling devices are arranged between the respective work positions in such a manner that the filling vessels of each filling device cover a wide angular range of the circular table. The work positions may be arranged, shifted relative to each other, for instance, 180 or 120 angular degrees.

Advantageously, the filling devices are arranged over the round table in such a manner that the filling sweeps during each rotary motion of the circular table are of equal length. It is furthermore advantageous to arrange wipers in the interior of the filling vessels.

FIGS. *3a–c* are cross sectional views of the die at various stages of filling.

DETAILED DESCRIPTION OF THE INVENTION

Figure 1:
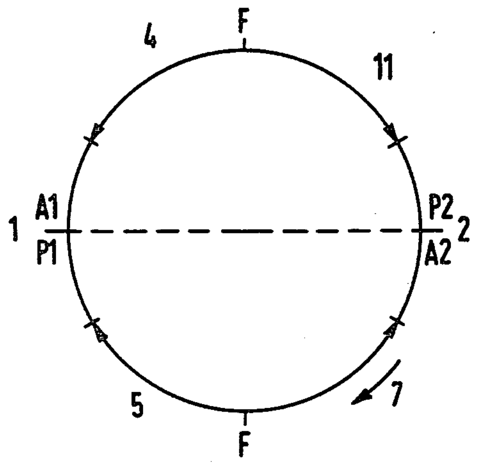
FIG. 1 shows, schematically, a press table with two work positions.
Figure 3A:
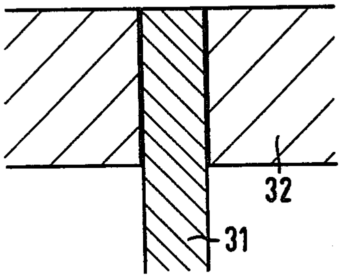
Figure 3B:
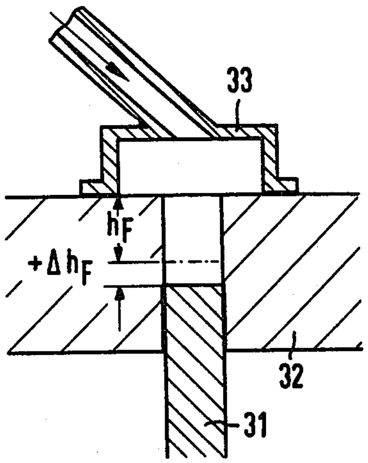
Figure 3C:
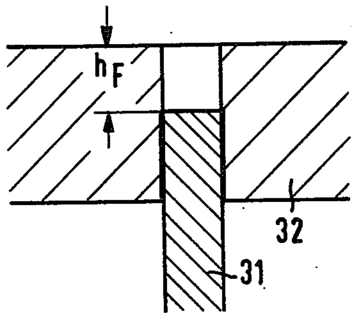

In FIG. 1 a press table 11 with the two work positions 1 and 2 is shown schematically. The work positions 1 and 2 are displaced relative to each other by 180° of angle. A pressing process P1 and an ejecting process A1 take place in work position 1. A pressing process P2 and an ejecting process A2 take place in work position 2. The pressing and ejecting take place while the press table 11 is standing still. The filling F of the die takes place during the transport of the work table 11 from the one work position to the other work position in the direction of the directional arrow 3. The filling sweep is indicated by the arcuate segments 4 and 5. During the filling process, the lower plunger 31 of the die 32 is moved downward from the position shown in FIG. 3*a* to the position shown in FIG. 3*b* via a cam, not shown in the drawing, so that the powder is sucked into the filling space of the die 32 from the filling device 33. If the rotary table is transported on, overfilling along the filling sweep is also possible, inasmuch as the lower plunger initially allows a greater filling height $h_F + \Delta h_F$ and is then lifted to the exact filling height $h_F$ as shown in FIG. 3*c* before the die opening leaves the filling region. The control is exerted via a cam which can be adjusted and readjusted. Thereby, the weight tolerance of the amount filled in can be controlled and adjusted.

Figure 2:
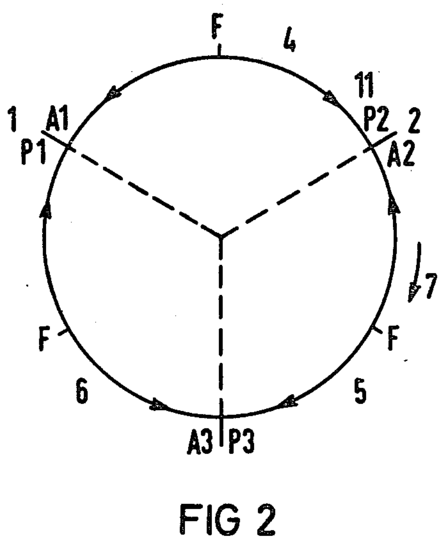
FIG. 2 illustrates, schematically, a press table with three work positions.

FIG. 2 shows schematically a press table 11 with three work positions 1, 2 and 3 which are shifted by 120° of angle, respectively. Pressing takes place in each work position P1, P2 and P3, the ejection takes place at A1, A2 and A3. Filling F takes place in the three zones, 4, 5, and 6 in between, when the press table 11 is transported in the direction of the directional arrow 7 from the one to the other work position.

In automatic multiple presses, multiple tools are frequently used to increase the output. In order to obtain uniform filling of the different cavities of the individual die breakthroughs of a multiple die, the filling sweep, during which the die opening is moved under the filling device, should be kept the same for the outer and inner breakthroughs. According to the present invention, this is accomplished via a special arrangement of the filling device. The filling vessel of the filling device is geometrically arranged so that the filling sweeps are of equal length during the respective switching time of the press table. By arranging wipers in the interior of the filling vessels, the powder layer standing in it is initially wiped off when the die moves underneath; the final wiping takes place when the die with the openings leaves the region of the filling vessel. The manner in which this occurs is evident from an examination of the filling device 33 of FIG. 3*b*.

What is claimed is:

1. In an automatic press for the manufacture of molded bodies from materials in powder form, in which a rotatable circular table with a vertical axis of rotation is provided on which filling devices with filling vessels and press tools are arranged at a uniform pitch, the improvement comprising: at least two work positions being provided on the circular table at a predetermined spacing of at least 120° from each other; means for carrying out, at each work position, while said press table is stationary, a respective pressing process for pressing the powder and a respective ejecting process for ejecting the finished molded body; and respective filling devices arranged between the work positions in such a manner that the filling takes place while the table is moving and that the filling vessel of each filling device covers a wide angular region of the circular table.

2. The improvement according to claim 1, wherein said work positions are shifted relative to each other by 180° of angle.

3. The improvement according to claim 1, wherein said work positions are shifted by 120° of angle.

4. The improvement according to claim 1, 2 or 3 wherein the filling vessel of each device is disposed above the circular table in such a manner that the filling sweep is of the same length during each rotary motion of the circular table.

5. The improvement according to claim 4 and further including wipers provided in the interior of the filling vessels.

6. The improvement according to claim 1 and further including wipers provided in the interior of the filling vessels.

* * * * *